Figures 1, 2:
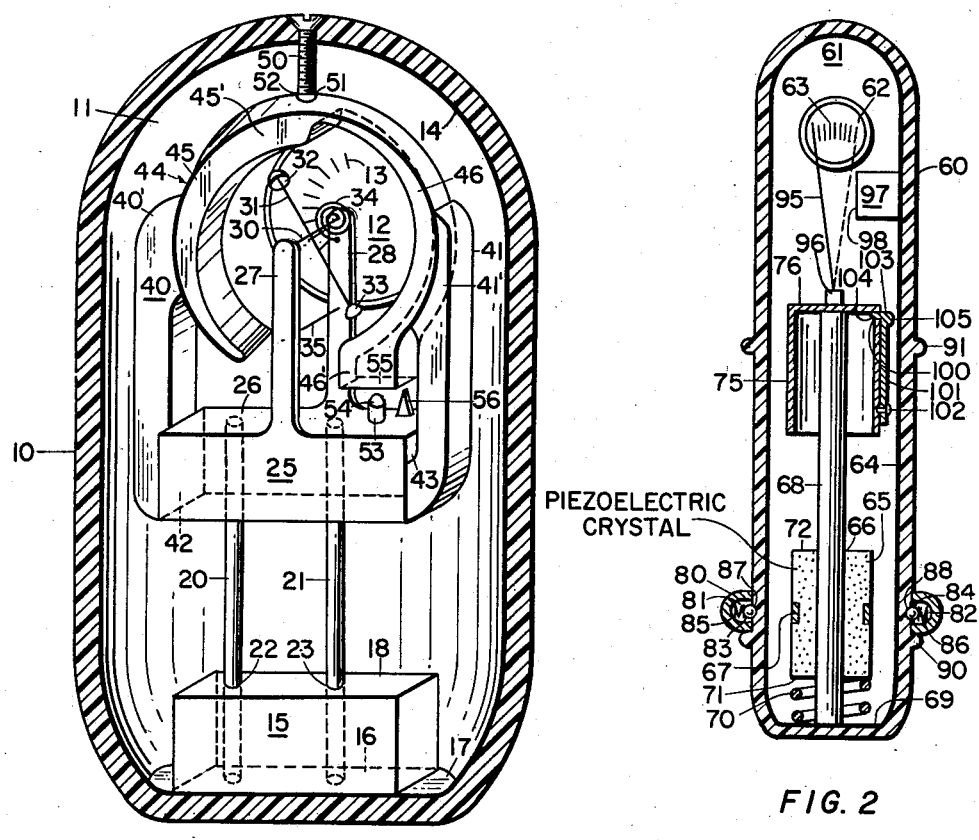

Aug. 4, 1959  H. E. HOLLMANN  2,898,472
RADIATION METER DEVICE
Filed Nov. 12, 1953

INVENTOR
HANS E. HOLLMANN

BY
ATTORNEYS

United States Patent Office 2,898,472
Patented Aug. 4, 1959

2,898,472

RADIATION METER DEVICE

Hans E. Hollmann, Oxnard, Calif.

Application November 12, 1953, Serial No. 391,777

4 Claims. (Cl. 250—83.6)

(Granted under Title 35, U.S. Code (1952), sec. 266)

The invention described herein may be manufactured and used by or for the Government of the United States of America for governmental purposes without the payment of any royalties thereon or therefor.

The present invention relates to a radiation meter device and more particularly to a radiation meter device utilizing a piezoelectric means for charging the device.

In my copending application, Serial No. 391,773, filed of even date herewith, now Patent 2,859,354, there is disclosed a device of a similar nature utilizing an electret means for charging the device. When an electret is employed to charge the device, the permanent electrostatic polarization of the electret is utilized to provide the charge, and therefore it is merely necessary to dispose the electret in operative position relative to the electrodes to produce a charge thereon. Obviously, the force and speed with which the electret is moved into operative position has no bearing on the charge produced on the electrodes since the polarization of the electret is substantially constant, and therefore the potential between the electrodes of the device will be substantially the same each time the device is charged. However, the danger exists that the electret may lose some of its polarization when exposed to strong radiations and therefore cause the initial charge on the electrodes of the device to vary, and consequently the calibration of the device will be incorrect and render it useless.

When a piezoelectric crystal is employed to charge the electrodes of the device, the well-known property of piezoelectric crystals to produce an electrical charge on the faces thereof when subjected to internal stresses is utilized to provide the charge. Consequently, it becomes necessary to provide a means whereby an internal stress may be selectively developed in the piezoelectric crystal in order to operate the device. Since the initial charge developed by the crystal is critical, the force and speed with which the movable member of the device is actuated becomes of great importance in order to provide a minimum charge to operate the device, and additional means must be provided to insure that the charge produced on the electrodes is substantially constant each time the device is operated. Since the charge produced by the piezoelectric crystal is unaffected by radiations, there is no danger that the device will become inoperative when subjected to radiation over prolonged periods of time, and therefore, an inherent disadvantage of a device employing an electret means to produce the charge is eliminated.

The present invention concerns portable radiation meters adapted to be carried about by a person to measure radiation intensity and avoid overexposure. Since the development of atomic energy, the need has arisen for a simple and inexpensive meter which will provide scientists and technicians who work in the vicinity of radioactive substances with a quick and reliable indication of the amount of radiation to which they have been exposed during a given period of time. Furthermore, in the event of an atomic war, such meters will be required in large numbers for civilians and military personnel who may be exposed to radiation subsequent to the explosion of an atomic bomb or the like. As radiation meters for disaster use are needed in large numbers, they must be simple and inexpensive to manufacture, and since the meters will be used by persons unfamiliar with such devices, they must be rugged, easy to use, and reliable in operation. In case of an atomic disaster, there is also the possibility that no batteries will be available and that there will be a failure of electric power, and it is therefore desirable that such meters be self-contained, requiring no external source of power. The maintenance required for the meters should also be kept to a minimum, avoiding the use of batteries or other sources of power which must be replaced from time to time, if possible.

Prior art radiation meters have proved disadvantageous for a variety of reasons. Such devices are complicated and expensive in construction, and unskilled personnel have difficulty in operating them. Known devices which require no external source of power employ some means of producing an electrostatic charge such as highly polished beads in a metal container or a miniature influence machine. Such electrostatic generator sources for producing the charge in the devices are unsatisfactory since wear and tear on the parts often prevents the generation of a sufficient charge to operate the meter. In addition, it is very difficult and time consuming to develop the same potential between the electrodes of such devices each time they are charged. Since radiation meters are calibrated for a certain initial potential existing between the electrodes thereof, readings obtained from the meters will be inaccurate when the initial potential between the electrodes is not of the proper magnitude.

The invention device utilizes an arrangement which is simple and inexpensive in construction, and it may be quickly and easily used by unskilled personnel. A piezoelectric crystal means which is suitably mounted in the device is utilized to charge the electrodes thereof, and therefore no external source of power is required. Means is provided whereby the device produces a substantially constant electrical potential between the electrodes thereof each time it is operated, and consequently, accurate and reliable readings are obtained.

An object of the present invention is the provision of a new and novel radiation meter device which may be dependably used by persons unfamiliar with such devices.

Another object is to provide a new and novel radiation meter device which is self-contained, requiring no external source of power.

A further object of the invention is the provision of a new and novel radiation meter device which is simple and inexpensive in construction, yet rugged and reliable in operation.

Other objects and many of the attendant advantages of this invention will be readily appreciated as the same becomes better understood by reference to the following detailed description when considered in connection with the accompanying drawings wherein:

Fig. 1 is an isometric view of a preferred embodiment of the device with a portion of the housing cut away, and Fig. 2 is a longitudinal section view of a modification of the device.

Referring now to the drawings, there is shown in Fig. 1 a hollow housing or body member 10 with the front half cut away for illustration, the housing being generally elliptical in cross-sectional configuration and having an enclosed chamber or cavity 11 formed therein. The housing is composed of an electrically nonconductive material which freely passes radioactive radiation such as synthetic resin, plastics, or the like. The housing is hermetically sealed, a gas such as air being disposed in chamber 11. A suitable desiccant such as lime or the like may also be disposed within the chamber. A transparent window 12 formed of glass or the like and having indicia 13 scribed thereon is mounted in a lateral portion member 10, and a similar window (not shown), is mounted diametrically opposite window 12 in that lateral portion of housing 10 which has been cut away. Window 12 may be a magnifying lens to facilitate the reading of deflections of the indicating means of the device relative to indicia 13. Indicia 13 are suitably spaced from one another to provide a calibrated scale such that correct readings may be obtained therewith.

A thin layer of electrically conductive material 14 is secured to the inner surface of housing 10, and may comprise, for instance, tin foil which may be glued to housing 10 or a thin copper coating which may be sprayed on the inner periphery of the housing. Layer 14 provides a "Faraday cage" which prevents external electrical fields from affecting the operation of the device and at the same time allows radiations to penetrate into chamber 11.

A piezoelectric crystal 15 which is generally rectangular in configuration is normally disposed in the position shown in the drawing, with the lower face 16 thereof in engagement with a flattened end portion 17 on the inner periphery of the housing. The lengthwise dimension of the crystal is disposed parallel with the transverse axis of an elliptical cross section of housing 10.

Two guide rods 20 and 21 formed of electrically nonconductive material such as ceramics or the like are secured at the lower ends thereof to portion 17. Rods 20 and 21 pass through two complementary passages 22 and 23 respectively which extend longitudinally through crystal 15 whereby when the device is inverted, the crystal is adapted to slide axially with respect to the guide rods. The rods extend upwardly through the open lower end of a hollow charging container 25, and the upper ends of the rods are secured to the lower surface of the upper wall 26 of the container.

Container 25 is formed of a suitable electrically conductive material such as copper, iron or the like, and two arms 27 and 28 are formed integral therewith, extending upwardly from opposite lateral portions of the container. A metallic spindle 30 is journaled at its opposite ends in the outer end portions of arms 27 and 28, and a metallic needle 31 is fixed at the midpoint thereof to the spindle such that the needle and spindle rotate as a unit. The needle has enlarged end portions 32 and 33 formed of electrically conductive material such as copper, iron or the like, and a small coil spring 34 is fixed at one end to arm 28 and at its other end to spindle 30 whereby the spindle and needle are urged in a counterclockwise direction as viewed in the drawing. A small bar 35 is secured at its opposite ends to arms 27 and 28, the bar serving as a stop means which is adapted to be engaged by the needle and thereby limit the rotational movement of the needle.

Two support members 40 and 41 formed of electrically nonconductive material are respectively secured to the outer peripheries of opposite end walls 42 and 43 of container 25, the end portions 40' and 41' of members 40 and 41 respectively being connected to diametrically opposite portions of a ring electrode 44 whereby the ring 44 is electrically insulated from container 25. The outer periphery of member 44 is symmetrical and concentric with the axis of spindle 30; however, the inner peripheries of the two halves 45 and 46 of the ring are eccentric with respect to the axis of spindle 30. The thickness of left half 45 of ring 44 increases from the lower to the upper portion 45' thereof, while the thickness of the right half 46 of the ring increases correspondingly from the upper to the lower portion 45' thereof. It is thus seen that the upper portion of ring segment 45 and the lower portion of ring segment 46 lie closest to the circular arcs defined by the enlarged end portions 32 and 33, respectively, of needle 31 on rotation thereof.

Needle 31 and end portions 32, 33 comprise one electrode of the device and ring 44 comprises the other electrode thereof, it being apparent that upon charging the electrodes with charges of different polarity, needle 31 will be rotated in a clockwise direction against the force of spring 34 from its starting position where end portions 32 and 33 of the needle are adjacent the thin portions of ring segments 45 and 46, respectively, into the position shown in the drawing where such end poritons of needle 31 are adjacent the thick portions 45' and 46', respectively, of ring 44.

A bolt 50 is threaded through an opening in housing 10 and sealed in place, the lower rounded end 51 of the bolt being seated in a similarly rounded depression 32 formed in the upper surface of ring 44. In this manner, the ring is supported in fixed relation to the housing and is electrically connected to layer 14.

It should be noted that container 25 is normally completely insulated from ring 44 and layer 14; however, means is provided for selectively electrically connecting the container to the ring and the layer. A small hollow metallic tube 53 is secured to the upper surface of wall 26 of container 25, and a cylindrically-shaped metallic pin or contact 54 is slidably fitted within a complementarily shaped cavity formed in the tube. The upper end of the tube is open whereby pin 54 is adapted to slide out of the tube and engage the lower surface 55 of the ring adjacent thereto when the device is inverted from the position shown in the drawing.

Since the device is calibrated for a certain initial potential existing between the electrodes thereof, means must be provided to insure that the same potential is produced on the electrodes each time the device is charged. In the device shown in Fig. 1, the distance which crystal 15 will travel when the housing is quickly inverted until the upper surface 18 of the crystal strikes the inner periphery of surface 26 is sufficient to provide an internal stress in the crystal which will produce a minimum charge on the electrodes. However, since the possibility exists that the charge may be too great, a small metallic contact 56 formed of copper, iron or the like is secured to the upper surface of wall 26, the upper end of the contact being spaced from surface 55 of ring 44 by a small air gap which may be on the order of 2 millimeters. This small air gap serves to limit the potential on the electrodes, since if an excessive potential exists therebetween, a spark will jump across the air gap thereby short circuiting the two electrodes whereupon the electrodes may be recharged by again inverting the housing. When the proper initial charge has been achieved, contact 56 will no longer cause a short circuit and the device is ready for operation. It should be understood that the charge produced by the crystal will be fairly constant, but contact 56 insures that the potential between the electrodes is within a tolerable limit for proper operation of the device.

The device shown in Fig. 1 may be modified by suitably securing the crystal permanently within container 25 as by gluing or the like with surface 18 adjacent the lower surface of wall 26. A weight member formed of iron, lead or the like is then substituted in place of the crystal 15 as shown in the drawing. The weight member may be of approximately the same size and configuration as crystal 15 whereby the weight member is adapted to slide along rods 20 and 21 and engage the crystal disposed in container 25. In this manner a suitable internal stress is developed in the crystal due to the impact of the weight on the crystal.

The operation of the device shown in Fig. 1 is as follows:

The housing is normally held in the position shown in the drawing with surface 16 of the crystal in engagement with portion 17 of the housing and pin 54 disposed within tube 53 so as to be out of engagement with ring 44. When the device is completely discharged, needle 31 is urged into engagement with bar 35 under the influence of spring 34. When it is desired to charge the device, housing 10 is inverted and crystal 15 slides along rods 20 and 21 until the upper surface 18 of the crystal engages the lower surface of wall 26 whereby internal stresses are developed in the crystal causing an electrical charge to be created on the opposite faces of the crystal. When the housing is inverted, pin 54 simultaneously slides partially out of tube 53 and engages the lower surface 55 of ring 44 thereby electrically connecting container 25 to ring 44 and layer 14.

Assuming that a positive charge is developed on the upper face of the crystal and that a negative charge is developed on the lower surface of the crystal when the crystal is disposed within container 25, the positive charges on surface 18 attract negative charges to the lower surface of wall 26 and the positive charges on the container are repelled through pin 54 to ring 44 and layer 14. The housing is then inverted to its original position as shown in the drawing, whereupon pin 54 disengages from the lower surface 55 of ring 44 and slides back within tube 53, and crystal 15 simultaneously slides back to the position shown in the drawing. Container 25, needle 31 and end portions 32, 33 are then negatively charged and ring 44 is positively charged whereby needle 31 is urged into the position shown in Fig. 1 due to the attraction between the oppositely charged needle and ring.

The meter is then ready for operation and the induced charge will remain on the device for a long period of time unless radiation causes it to discharge. As the meter is subjected to radiation, the gas within chamber 11 will ionize, causing the device to discharge whereupon the needle will be urged counterclockwise by spring 34 as the attraction between the electrodes weakens. It is evident that the meter will measure the total radiation to which it has been exposed, and therefore by observing the movement of needle 31 relative to indicia 13, a person is enabled to determine the amount of radiation he has been subjected to. By observing the movement of needle 31 during a given time interval, the rate of radiation absorption may also be determined. When the device has been discharged, it is merely necessary to again invert housing 10 such that crystal 15 is moved into container 25 and then return the housing to its original position whereby the crystal will return to its original position and the device will be recharged and ready for operation.

Referring now to Fig. 2, there is shown a modification of the device including a hollow housing 60 of the same size and material as housing 10 in Fig. 1, the housing being hermetically sealed and having a gas such as air and a suitable desiccant disposed within an enclosed chamber or cavity 61 formed therein. A transparent window 62 formed of glass or the like and having suitable indicia 63 scribed thereon is mounted in a lateral portion of member 60, and a similar window (not shown), is mounted diametrically opposite window 62 in that lateral portion of housing 60 which has been cut away. As in the device shown in Fig. 1, window 62 may be a magnifying lens to facilitate the taking of readings with the device. A thin layer of metallic material 64 is secured to the inner periphery of housing 60 for the same purpose and in a manner similar to that in which layer 14 is disposed on the inner periphery of housing 10 in Fig. 1.

A piezoelectric crystal 65 which is cylindrical in configuration has a longitudinally extending passage 66 formed therethrough and a ring 67 formed of a suitable magnetic material such as iron or the like is secured circumferentially about the crystal. A guide rod 68 extends through passage 66 and is secured at its lower end to the inner end wall 69 of the housing. A compression spring 70 is disposed about the lower end of rod 68, one end of the spring engaging wall 69 and the opposite end of the spring engaging the lower surface 71 of crystal 65 whereby the crystal is urged in an upward direction as seen in the drawing. Rod 68 extends upwardly through the open end of a cylindrical charging container 75, the upper end of the rod being secured to the lower surface of the upper wall 76 of the container.

A ring-shaped permanent magnet 80 formed of alnico or the like is provided at diametrically opposite points with two radial passages 81 and 82 having ball detents 83 and 84 disposed respectively therein. Compression springs 85 and 86 urge balls 83 and 84 respectively inwardly toward the housing, and in the position shown in the drawing, the balls are seated in complementary depressions 87 and 88 formed in housing 10. Magnet 80 attracts ring 67, the magnet and the crystal therefore moving as a unit, and consequently when balls 82 and 83 are seated in depressions 87 and 88, the crystal will be restrained in the position shown in Fig. 2. A first peripheral flange 90 formed integral with the outer periphery of housing 60 limits the movement of the magnet in a downward direction, and a second peripheral flange 91 formed integral with the outer periphery of housing 60 limits the movement of the magnet in an upward direction to prevent damage the components of the device. Whereas in the device shown in Fig. 1, the possibility exists that the device may be accidentally inverted or jarred causing the crystal to be positioned within the charging container before the device is completely discharged, it is apparent that the permanent magnet in the device shown in Fig. 2 prevents such accidental displacement of the crystal.

Container 75, which is spaced from the inner periphery of the housing, is formed of a suitable electrically conductive material such as copper, iron or the like and a thin elongated flexible electrode 95 formed of a similar material is mounted at its lower end in a centrally located extension 96 formed integral with wall 76. Member 95 is so mounted in extension 96 that it is normally disposed in the position shown in Fig. 2 when the device is not charged.

An electrode 97 formed of an electrically conductive material similar to that of member 95 is secured to the inner periphery of housing 60 and is in contact with layer 64, member 97 having a knife edge 98 formed on a lateral portion thereof.

It should be noted that container 75 is normally completely electrically insulated from electrode 97 and layer 64; however, means is provided for selectively electrically connecting container 75 to electrode 97 and layer 64. An opening 100 is provided in a lateral portion of the container, and a resilient leaf-spring member or contact 101 formed of a material similar to that of the container is secured at one end thereof to the outer periphery of the container by a small stud 102. An arm 103 extends perpendicularly from the opposite end of member 101 and passes through opening 100, the outer end of arm 103 being formed as a sloping cam surface 104. The natural resiliency of member 101 normally urges it into the position shown in Fig. 2; however, it is apparent that when crystal 65 is moved into container 75, the outer periphery of the upper surface 72 of the crystal will engage cam surface 104 and urge arm 103 outwardly until rounded portion 105 thereof engages layer 64. A small contact spaced from layer 64 by a small air gap may be provided on a lateral portion of container 75 for the same purpose as contact 56 in Fig. 1.

The operation of the device shown in Fig. 2 is as follows:

The housing is normally held in the position shown in the drawing with crystal 65 held in position by means of the detent means in ring 80, and contact 101 is positioned such that portion 105 is out of contact with layer 64. When the device is completely discharged, electrode 95 is positioned as shown at its maximum distance away from knife edge 98. When it is desired to charge the device, ring 80 is manually grasped and moved slightly upwardly until balls 82 and 83 are out of depressions 87 and 88 whereupon the ring is free to move upwardly along with the crystal under the influence of spring 70. Since it is desired to create a constant potential on the electrodes of the device each time it is charged, the upper surface 72 of crystal 65 should strike the lower surface of wall 76 with the same force each time. The spring will supply a constant force urging the crystal upward and a mark may be provided on the outer periphery of housing 60 with which ring 80 may be aligned to insure that the ring is released from the same point each time. In this manner, a substantially constant force is provided for urging the crystal into the charging container and a constant charge will be developed since the charge developed is proportional to the internal strain developed in the crystal. When crystal 65 moves into container 75, contact 101 is cammed outwardly until portion 105 engages layer 64 thereby electrically connecting container 75 to layer 64 and electrode 97. Ring 80 is then manually returned to its original position moving crystal 65 downwardly out of the charging container and allowing portion 105 to disengage from layer 64. Balls 82 and 83 will maintain the ring and crystal in their lower position until the device is manually recharged.

Assuming that the upper surface 72 of the crystal is positively charged and that the lower surface 71 thereof is negatively charged, container 75 and electrode 95 are then negatively charged and electrode 97 is positively charged in a manner similar to the charging of the electrodes of the device shown in Fig. 1 whereby electrode 95 is attracted toward knife edge 98 and is positioned as shown in dotted lines on the drawing. The meter is then ready for operation, and as it is subjected to radiation, the device discharges whereupon electrodes 95 is urged to the left due to its natural resilience.

A substantially constant potential is developed beween the electrodes of the device shown in Fig. 1 due to the constant distance through which the crystal must move and the contact 56 which prevents excessive potentials from being developed, and a consant potential is developed between the electrodes of the device shown in Fig. 2 due to the fact that the crystal 65 is urged into the container 75 with a constant force as determined by spring 70. Although the configurations shown for the housings, containers and crystals are considered to be preferable, various other configurations may be utilized if desired.

It is apparent from the foregoing that there is provided a new and novel radiation meter device which may be dependably used by unskilled personnel and that the device is self-contained, requiring no external source of power. The device is simple and inexpensive in construction, yet is rugged and reliable in operation.

Obviously many modifications and variations of the present invention are possible in the light of the above teachings. It is therefore to be understood that within the scope of the appended claims the invention may be practiced otherwise than as specifically described.

I claim:

1. A radiation meter device which comprises a hollow housing having an enclosed chamber formed therein, a thin layer of metallic material disposed on the inner periphery of said housing, a first knife-edged electrode supported within said chamber and electrically connected to said layer, a second electrode comprising an elongated flexible metallic member supported by a charging container disposed within said chamber, said second electrode being so mounted as to be normally spaced from said first electrode, said second electrode and said charging container being normally electrically insulated from said first electrode, piezoelectric crystal means normally positioned within said chamber and adapted to be selectively positioned within said charging container, means for selectively electrically connecting said charging container to said first electrode, said last-mentioned means comprising a movable contact supported by a lateral portion of said charging container and normally biased away from said layer, said crystal means being adapted to urge said movable contact into engagement with said layer when said crystal means is moved into said charging container, a metallic member secured to said crystal means, magnetic means slidably fitted about the outer periphery of said housing and adapted to move said metallic member and said crystal means when said magnet is moved relative to said housing, resilient means disposed within said chamber urging said crystal means toward said charging container, and detent means mounted in said magnetic means for retaining said crystal means at a position displaced from said charging container.

2. A radiation meter which comprises a hollow housing formed of electrically nonconductive material and having an enclosed chamber formed therein, a thin layer of metallic material disposed on the inner surface of said housing, said housing being adapted to freely pass radioactive radiations, means mounted in said housing for permitting the interior of said meter to be viewed from exterior thereof, a first electrode supported within the upper portion of said chamber in fixed relation to said housing, a second electrode movably mounted within said chamber adjacent to said first electrode, at least one guide means extending from the lower portion of said chamber to the vicinity of said first electrode, and a piezoelectric crystal mounted on said guide means and designed for slidable movement therealong, such that a sliding movement of said crystal along said guide means from an inactive position in the lower portion of said chamber to an active position in the upper portion of said chamber where it is in electrical contact with said first electrode will cause an electric potential to be developed between said first and second electrodes the magnitude of which is determined in part by the distance traveled by said crystal along said guide means from its inactive to its active position.

3. A radiation meter as defined in claim 2, further including a tensioning device within said chamber, whereby slidable movement is imparted to said crystal through the release of said tensioning device.

4. The combination of claim 3 in which said tensioning device is a coil spring normally in contact with said piezoelectric crystal.

References Cited in the file of this patent

UNITED STATES PATENTS

| 2,646,516 | Futterknecht | July 21, 1953 |
| 2,668,245 | Rich | Feb. 2, 1954 |
| 2,683,222 | Failla et al. | July 6, 1954 |

FOREIGN PATENTS

| 1,292 | Great Britain | Jan. 18, 1911 |